Oct. 20, 1925.
F. L. THOMPSON
1,557,901
MOVABLE HEADLIGHT MOUNTING
Original Filed June 26, 1924
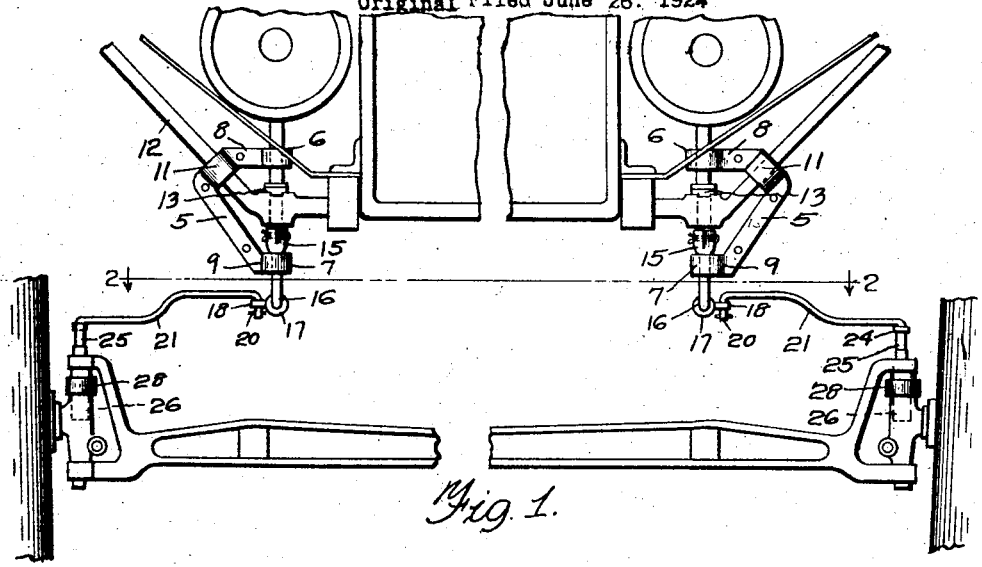
Fig. 1.
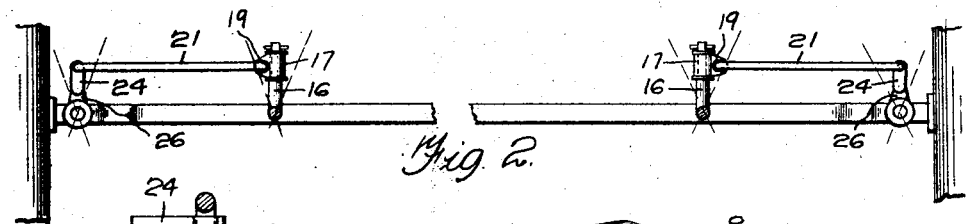
Fig. 2.
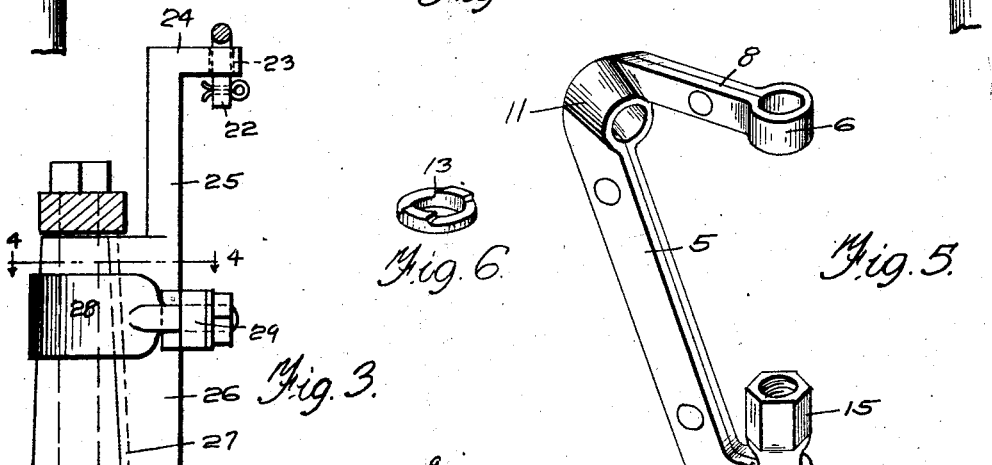
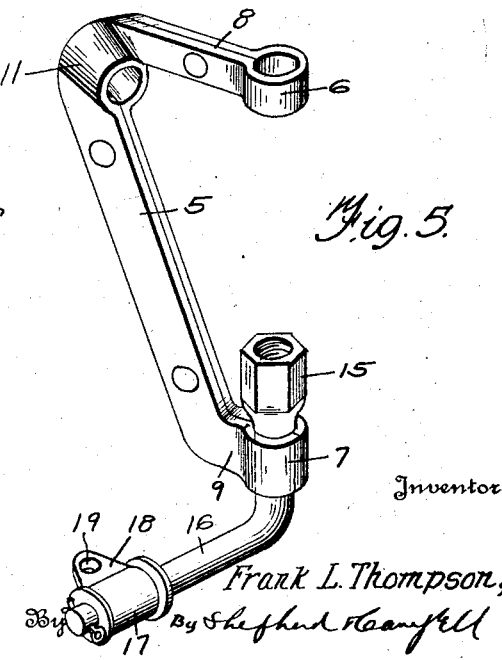
Fig. 3.  Fig. 6.  Fig. 5.
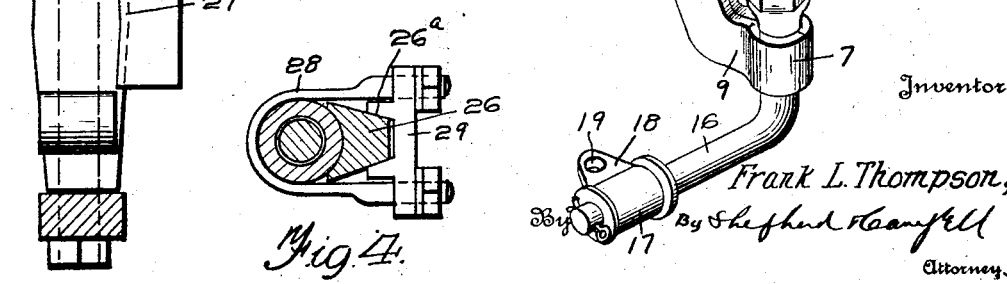
Fig. 4.
Inventor
Frank L. Thompson,
By Shepherd & Campbell
Attorneys Patented Oct. 20, 1925.

1,557,901

UNITED STATES PATENT OFFICE.

FRANK L. THOMPSON, OF OKLAHOMA CITY, OKLAHOMA.

MOVABLE-HEADLIGHT MOUNTING.

Application filed June 26, 1924, Serial No. 722,509. Renewed September 15, 1925.

*To all whom it may concern:*

Be it known that I, FRANK L. THOMPSON, citizen of the United States, residing at Oklahoma City, in the county of Oklahoma and State of Oklahoma, have invented certain new and useful Improvements in Movable-Headlight Mountings, of which the following is a specification, reference being had therein to the accompanying drawings.

This invention relates to means for attaching the head lights of automobiles to the steering mechanism of the automobile in such manner that the lights will turn as the front wheels turn so that the rays from the head lights may be thrown around a turn that is being approached instead of being directed straight ahead and off of the road way.

It is a primary object of the present invention to provide a structure of the character above set forth which comprises but a few simple and inexpensive parts and these of such nature as to co-act with existing parts of the automobile so that the desired results may be accomplished without any radical changes in the automobile construction and at a very small cost.

Further objects and advantages of the invention will be set forth in the detailed description which follows:

In the accompanying drawings Fig. 1 is a fragmentary front elevation of an automobile having the invention applied thereto.

Fig. 2 is a plan view upon line 2—2 of Fig. 1 with some of the parts in section.

Fig. 3 is a view of the spindle body of an automobile front wheel with one of the elements of the invention clamped thereto.

Fig. 4 is a sectional view on line 4—4 of Fig. 3.

Fig. 5 is a perspective view of a bracket and one of the parts of the invention mounted therein; and Fig. 6 is a perspective view of a washer hereinafter referred to.

Like numerals designate corresponding parts in all of the figures of the drawing.

In carrying out the invention I provide a bracket 5 of the peculiar shape illustrated in Figure 5, having the vertically aligned eyes 6 and 7 which are carried by substantially horizontal arms 8 and 9 and which arms are connected by an inclined arm 10. An angularly disposed sleeve 11 is adapted to engage one of the fender braces 12 of the automobile, in such manner that the arms 8 and 9 will lie horizontally and present the bearing eyes 6 and 7 in vertical alignment.

In applying the device the usual retaining nut is removed from the lower end of the shank or stem of the lamp and the lamp is lifted enough to permit of a washer 13 being slipped upon the said shank of the lamp; after which the lamp shank is passed downwardly through the eye 6 with the usual washer-like enlargement of the shank 14 bearing upon the washer 13.

The lower end of the shank or stem of the lamp from which the usual retaining nut was removed, is screwed into a nut like member 14 formed upon the upper end of an L shaped member 16, the vertical leg of which is journaled in the eye 7 and the horizontal leg of which has a sleeve 17 pivotally mounted thereon. This sleeve carries a laterally extended ear 18 which is pierced at 19 for the reception of the downturned end 20 of the rod 21. The other end of this rod is down-turned at 22 to pass through an opening 23 formed in a crank extension 24 of a vertically extending rod 25. The rod 25 carries on its lower end a block-like member 26 the outer face of which is tapered and the inner face of which is cut out both transversely and vertically to cause it to snugly fit the side of the spindle body 27 of the front wheel of an automobile.

The structure above described is duplicated for each of the head lights of the automobile. The block 26 is clamped firmly against the side of the spindle body 27 by means of a clamp 28 which is U shaped and which passes through a cap 29, the inner face of which is cut out to receive the beveled portion 26ᵃ of the block 26.

This structure very firmly secures block 26 to the spindle of the wheel and insures that the two will move together. As the wheel turns under the steering of the automobile the crank 24 is moved and rod 21 is moved in one direction or the other according to the direction of the movement of the front wheels in the steering action. This in turn moves the head lights in a proportionate degree.

From the foregoing description it will be seen that the means herein provided for carrying out the objects of the invention are of a very simple and inexpensive nature and that they have been designed to co-act with existing parts of an automobile. For example the novel bracket 5 is adapted to co-act with the usual fender brace of the automobile while the block 26 is adapted to co-act with the usual spindle body 27. However, it is to be understood that I contemplate changing the construction as may be necessary to fit the parts of the particular automobile upon which it is desired to use the same. Consequently it is to be understood that the invention is not limited to the precise construction set forth but that it includes within its purview whatever changes fairly come within either the terms or the spirit of the appended claims.

Having described my invention what I claim is:

1. A device of the character described comprising a bracket having a pair of aligned eyes a third eye to embrace the fender brace of an automobile the said last named eye lying at such an angle as to support the first two eyes in alignment in a vertical plane, a lamp having its stem passed through the upper of said eyes an L shaped member journaled in the lower of said eyes and internally threaded for the reception of the usual threaded lower end of the stem of the lamp; said last named member comprising a crank portion and a pivoted sleeve said sleeve carrying a lateral ear thereon, a member clamped to the spindle body of an automobile and having a crank at its upper end and a rod connecting said crank and the lateral ear.

2. In a device of the character described the combination with the spindle body of an automobile of a block cut out both vertically and laterally and fitting the side of said spindle body, a clamp securing said block against the side of the spindle body said clamp comprising a U shaped part embracing the body and block and a bridge piece recessed to receive said block, a crank upon the upper end of said block, a rod having a down turned end passing through said crank, a bracket adapted to engage the fender brace of an automobile and having a pair of aligned eyes an L shaped member constituting a crank journaled in the lower eye said member carrying an internally threaded cup like member upon its upper end and a sleeve pivoted upon the outer end of its lower portion, with which said rod engages, and a lamp the stem of which is journaled in the upper eye of said bracket, the lower threaded end of the stem being engaged with said nut like member.

In testimony whereof I hereunto affix my signature.

FRANK L. THOMPSON.